United States Patent Office

3,321,415
Patented May 23, 1967

3,321,415
POLYURETHANES PREPARED FROM POLYHYDROXYUREA POLYAMINES
Hans Joachim Hennig, Cologne-Stammheim, and Günther Braun, Cologne-Flittard, Germany, assignors to Farbenfabriken Bayer Aktiengesellschaft, Leverkusen, Germany, a German corporation
No Drawing. Filed Aug. 12, 1964, Ser. No. 389,207
Claims priority, application Germany, Aug. 28, 1963, F 40,604
7 Claims. (Cl. 260—2.5)

This invention relates to a process for the production of cellular polyurethanes.

Numerous methods are available for the preparation of cellular polyurethanes from compounds containing at least two reactive hydrogen atoms which are reactive with NCO groups, organic polyisocyanates, water and/or any other suitable blowing agent and a catalyst. Some such methods are discussed in various publications such as "Bayer-Kunststoffe," 2nd Edition, 1959, page 25. In these methods both highly elastic and extremely rigid urethane foam materials are produced, as well as all intermediate types of polyurethane foam materials with a steady transition from one extreme to the other simply by choosing suitable reactants. Rigid urethane foam materials, for example, require the use of starting compounds having a functionality of three or more in certain proportions with other reactants in order to obtain the necessary degree of branching to make a rigid foam. Some such polyfunctional compounds often employed in the preparation of rigid cellular polyurethanes are ureas and polyureas. These polyfunctional compounds are used to obtain the proper degree of branching within the molecule and may be cross-linked with suitable cross-linking agents, preferably polyhydric alcohols and amino alcohols.

Another important constituent of a polyurethane reaction mixture is the catalyst, which is generally a tertiary amine. Catalysts are important in the preparation of cellular polyurethanes since they initiate and accelerate the reaction between the reactive hydrogen atoms and the isocyanate groups in order to obtain complete reaction between the isocyanate and the active hydrogen containing compounds, with the proper degree of branching within the molecule.

Keeping the relationship between the active hydrogen containing compound, the cross-linking agent and the catalysts for the preparation of a polyurethane in mind, it is an object of this invention to provide a process for making a polyurethane from an organic compound which will react with an isocyanate to form a polyurethane, which organic compound posseses the properties of a urea and permits a high degree of branching within the polyurethane molecule. It is a further object of this invention to provide a process for making a polyurethane from an organic compound containing at least two reactive hydrogen containing groups which possess "built-in" cross-linking groups. It is a further object of this invention to provide a compound containing at least two reactive hydrogen containing groups which are reactive with NCO groups which possesses the characteristics of tertiary polyamines and are, therefore, highly effective catalysts for the isocyanate reactions. A further object of this invention is to provide an organic compound containing at least two reactive hydrogen containing groups which is highly compatible and, therefore, miscible with the other reactants in the preparation of a cellular polyurethane. Yet another object is to provide an organic compound containing at least two reactive hydrogen containing groups which is particularly suitable for the preparation of rigid polyurethane foams.

The foregoing objects and others are accomplished in accordance with this invention, generally speaking, by providing a process for the production of cellular polyurethanes which comprises reacting an organic compound containing at least two reactive hydrogen containing groups as determined by the Zerewitinoff method, an organic polyisocyanate and water and/or any other suitable blowing agent, wherein all, or at least part, of the compound containing reactive hydrogen containing groups is a compound having the generic formula:

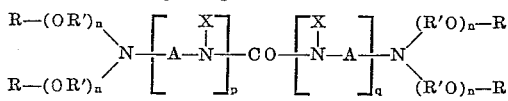

wherein R is an hydroxyalkyl group having at least two carbon atoms; R' is an alkylene group having at least two carbon atoms; A is a bivalent aliphatic cycloaliphatic or aromatic hydrocarbon radical which may be either linear or branched, saturated or unsaturated, or which may even contain heteroatoms; X is hydrogen or the grouping —(R'O)$_n$—R, in which $n$ is zero or integer between 1 and 50; and $p$ and $q$ are integers between 1 and 5.

Some illustrative examples of the radical R are hydroxypropylene and hydroxybutylene. Some illustrative examples of the radical R' are propylene and butylene. Some illustrative examples of the radical A are ethylene and tetramethylene.

The polyhydroxyurea polyamines of this invention which are represented by the above generic formula combine the properties of tertiary polyamines with those of a urea and have a high degree of branching in relation to the number of hydroxyl groups in the compounds, making them especially suitable for the preparation of polyurethane foams. The polyhydroxyurea polyamines therefore combine the functions of a reaction component having a cross-linking action with those of a highly effective basic catalyst for the numerous isocyanate reactions which take place during the foaming operation in the preparation of a cellular polyurethane. Further, because of the polar character of the urea grouping in the polyhydroxyurea polyamines, an added advantage in using these compounds in the preparation of a cellular polyurethane is the very favorable influence such polar groupings have on the physical properties of the foam materials being produced.

The polyhydroxyurea polyamines of this invention are prepared by the reaction between a urea, a polyamine and an olefine oxide in the molar ratio of 1 mol of the urea to 2 mols of a polyamine to from about 4 to about 306 mols of an olefin oxide. Those polyhydroxyurea polyamines which contain no ether groupings, that is, where $n$ in the generic formula is equal to zero, can be obtained, for example, by the condensation of polyhydroxyalkyl polyamines with ureas having the general formulae $$H_2N—CO—NH_2$$

$$R''—NH—CO—NH_2$$

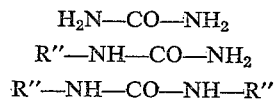

wherein R'' represents an alkyl group. The components of the condensation reaction are mixed in a molar ratio of two parts of the polyhydroxyalkyl polyamine to one part of one or a mixture of any of the ureas of the above general formulae with the evolution of ammonia or an alkylamine taking place during the process of the reaction. After the condensation product is formed, an olefine oxide or mixtures thereof may be added exhaustively thereto if desired.

The polyhydroxyalkyl polyamine mentioned in the above preparation is a compound prepared by the addition of a maximum of ($z+1$) mols. of any suitable olefine oxide to any suitable polyamine having a total of $z$ nitrogen atoms in the generic formula

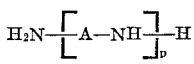

Polyhydroxyurea polyamines which contain ether groups, that is, where $n$ in the polyhydroxyurea polyamine generic formula is equal to 1 to 50, are formed, for example, by the further addition of olefine oxides or mixtures of olefine oxides to the above defined polyhydroxyurea polyamines in which $n$ in the generic formula is equal to 0; this further addition is preferably carried out in the presence of alkali catalysts.

Any suitable urea may be used in the preparation of polyhydroxyurea polyamines. Some such suitable ureas are, for example, urea, methylurea, ethylurea, propylurea, N,N'-dimethylurea, N,N'-diethylurea, n-butylurea, N,N'-di-n-butylurea, isobutylurea, N-methyl-N'-propylurea, cyclohexylurea, phenylurea.

Any suitable olefine oxide and/or mixtures thereof may be used in the preparation of polyhydroxyurea polyamines. Some such suitable olefine oxides are, for example, ethylene oxide, propylene oxide, 1,2- and 2,3-butylene oxides, hexene oxide, cyclohexene oxide, epichlorohydrin, styryl oxide.

Any suitable polyamine may be used in the preparation of polyhydroxyurea polyamines and polyhydroxyalkyl polyamines. Some such suitable polyamines are, for example, ethylene diamine, 1,2- and 1,3-diaminopropane, 1,4-diaminobutane 1,6-diaminohexane, diethylene triamine, triethylene tetramine, tetraethylene pentamine, dipropylene triamine, tripropylene tetramine, diamines of higher dicarboxylic acids, especially dimerized fatty acids, polyamines prepared by the addition of acrylonitrile to water, polyalcohols and polyphenols, and the subsequent hydrogenation of the nitrile groups, 1,2-, 1,3- or 1,4-xylylene diamines, 1,3-diamino-1-phenyl propane, 1,3-diamino-1,3-diphenylpropane, o- m- and p- (hexahydro)-phenylene diamines, toluylene diamines, naphthalene diamine, (hydrogenated) 4,4'-diaminodiphenylmethane. Further, any of the foregoing and other polyamines suitable for use in this invention may be substituted by hetero atoms on the bivalent radical between the amine groups. Some such hetero atoms which may be substituted thereon are, for example, the organic radicals may be substituted with any suitable substituent, such as, for example, halogeno such, as, for example, chloro, bromo, iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

In the preferred embodiment of this invention, the polyhydroxyalkyl polyamines which contain no ether groupings, that is, where $n$ in the generic formula is equal to 0, are easily and expediently prepared in a "single pot" process. In this process, the first step comprises adding a maximum of $(z+1)$ mols, of an olefine oxide to 1 mol. of a polyamine having $z$ nitrogen atoms, to form a polyhydroxyalkyl polyamine. This first step of the preparation takes place at a temperature between about 50° and about 250° C. but preferably between about 80° to about 120° C. Further, the reaction may be carried out under pressure and/or with the use of catalytic quantities of water or an alcohol, if desired.

In the second step of the "single pot" process, two mols. of the polyhydroxyalkyl polyamine prepared in the first step are condensed with one mol. of a urea, which may also be a substituted urea if desired, to form a polyhydroxyurea polyamine which possesses no ether groupings, that is, where $n$ in the generic formula is equal to zero. This reaction takes place with the evolution of ammonia or an alkylamine. The speed of the reaction in this second step is dependent on the temperature at which the reaction is carried out, and temperatures between about 100° and about 200° C. have proven to be the most expedient. If desired, the heating of the reaction mixture may be carried out under reduced pressure or while passing an inert gas such as nitrogen through the reaction mixture in order to facilitate the removal of the ammonia or the alkylamine formed during the reaction.

In the third step of the "single pot" process, olefine oxides are exhaustively added to the polyhydroxy urea polyamines, preferably to those polyhydroxy urea polyamines which still contain secondary amino groups.

If desired, a fourth step may be added to the process wherein olefine oxides are added to the polyhydroxyurea polyamines already prepared after a basic catalyst has been added to the reaction mixture. In this step, a polyhydroxyurea polyamine having ether bonds is prepared; that is, $n$ in the generic formula is equal to 1 to 50. The addition of olefine oxides in the preparation of polyhydroxyurea polyamines having ether bonds is generally carried out at temperatures of between about 100° and about 200° C. If desired, the heating of the reaction mixture may be carried out with the use of super atmospheric pressure, but it must be carried out with the addition of a catalyst such as, for example, alkali catalysts including caustic potash, caustic soda, soda, potash or an alkali metal alkoxide. After completing the addition of all of the reactants, the catalyst is neutralized by adding an acid to the reaction mixture and any water present is removed under reduced pressure at about 80° to about 120° C. while the product formed is filtered off from the salt which precipitates in the neutralization reaction of the basic catalyst.

Where the production of polyhydroxyurea polyamines is required in relatively large batches, it is recommended that the urea constituent be added to the hydroxyalkyl-substituted amines either in small proportions or else continuously over a relatively long period of time. This manner of adding the urea constituent has been found to be the most expedient for maintaining control over the evolution of ammonia or the alkylamine which is split off during the reaction.

The ureas may be added to the other constituents in an aqueous solution or in an organic solvent solution. Any suitable organic solvent which will dissolve the urea but which will not interfere with the reaction may be used. Examples of some such suitable solvents are cresol, o-dichlorobenzene, chlorobenzene, xylene, dioxane, nitrobenzene, dinitrobenzene. Where an aqueous or solvent solution of the urea is used, however, it is necessary to remove the water or the organic solvent from the product; this may be accomplished, for example, by distillation either during or after the condensation of the reactants. From the economical point of view, however, it is preferred that the preparation of polyhydroxyurea polyamines be carried out without the use of water or organic solvents, thus obviating the necessity of additional purification steps in the procedure.

The polyhydroxyalkyl polyamines formed in the first step of the hereinbefore described "single pot" process may be reacted with constituents other than a urea in the second step to form polyhydroxyurea polyamines and one such suitable constituent is phosgene. The reaction with phosgene, however, requires the addition of an acid acceptor or base to the reaction mixture and the removal of the solids formed in the neutralization reaction, so that it is generally preferred to use the urea condensation method for preparing the polyhydroxyurea polyamines.

The starting materials from which the polyhydroxyurea polyamines are prepared are generally mixtures of differently substituted urea polyamines. These compounds are formed by the addition of olefine oxides to polyamines so that mixtures of polyamines substituted with hydroxyalkyl groups are formed. These mixtures of polyamines substituted by hydroxyalkyl groups are especially useful since they need no further purification. In the subsequent reaction steps in which urea is condensated with the polyhydroxy alkyl polyamine mixture, additional diverse combinations of the reactants are possible with the result that the reaction product is generally a heterogeneous one.

Depending on the components and the proportions used, the polyhydroxy urea polyamines of this invention are more or less viscous, light-colored materials with a maximum hydroxyl number of about 820 mg. KOH/g.; under infra-red analysis, these compounds show the characteristic ureacarbonyl band at 1675 cm.$^{-1}$ in the infra-red spectrum.

In the preparation of cellular polyurethanes, the polyhydroxy urea polyamines are foamed together with the organic polyisocyanates and water and/or other suitable blowing agents and possibly additives such as emulsifiers, stabilizers, catalysts, and, if desired, any other suitable compound containing active hydrogen atoms which are reactive with NCO groups. Because of their excellent miscibility and compatibility with the other reactants in the preparation of a cellular polyurethane, the polyhydroxyurea polyamines may be processed together with any of the other reactants in the preparation of a cellular polyurethane, including other polyhydroxyl compounds such as, for example, polyesters, polyethers, polythioethers, polyacetals, adducts of alkylene oxides and polyamines, and alkoxylated phosphoric acids.

Some such suitable polyesters with which polyhydroxyurea polyamines may be mixed in the preparation of a cellular polyurethane are, for example, those which are prepared from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Some suitable polyhydric polyalkylene ethers with which polyhydroxyurea polyamines may be mixed in the preparation of cellular polyurethanes are, for example, the condensation products of alkylene oxides, beginning with any suitable initiator. The initiator may be a difunctional compound, including water, so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds. It is preferred that the initiator have from 2 to 8 active sites to which the alkylene oxides may add, which active sites include, for example, amino groups, hydroxyl groups, and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required where they are used. The resulting polyhydric polyalkylene ethers with the various bases of nitrogen, phosphorus and the like may have either primary or secondary hydroyl groups or mixtures of primary and secondary hydroxyl groups. It is preferred to use alkylene oxides which contain from 2 to 5 carbon atoms and, generally speaking, it is advantageous to condense from about 5 to about 30 mols of an alkylene oxide per functional group of the initiator. There are many desirable processes for the preparation of polyhydric polyalkylene ethers including U.S. Patents 1,922,459; 3,009,939 and 3,061,625, the process disclosed by Wurtz in 1859 and in Encyclopedia of Chemical Technology, volume 7, pages 257 to 262, published by Interscience Publishers, Inc. (1951).

Specific examples of suitable initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N'-N'-tetrakis-)2-hydroxypropyl) ethylene diamine, diethylene triamine and the like.

Some suitable polythioethers with which the polyhydroxyurea polyamines of this invention may be mixed in the preparation of a cellular polyurethane are, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

Some suitable polyacetals which may be used are, for example, the reaction product of formaldehyde or any other suitable aldehyde with any suitable polyhydric alcohol such as those disclosed above for use in the preparation of hydroxyl polyesters.

In the preparation of adducts of alkylene oxides with polyamines which are suitable in the practice of this invention, any suitable alkylene oxide may be used, such as ethylene oxide, propylene oxide, butylene oxide, amylene oxide, hexylene oxide, heptylene oxide, octylene oxide, nonylene oxide, decylene oxide, undecylene oxide, tetrahydrofuran, epichlorohydrin and the like.

Any suitable polyamine may be used such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimide, 2,5-diamino-1,3,4-thiadiazol and the like.

Any suitable alkoxylated phosphoric acid may be used such as, for example, the reaction product of any of the above enumerated alkylene oxides with phosphoric acid.

In the preparation of a cellular polyurethane, any suitable polyisocyanate may be reacted with the above enumerated compounds. Some such suitable polyisocyanates are, for example, aliphatic and aromatic polyvalent isocyanates. Some such suitable compounds are tetramethylenediisocyanate, hexamethylenediisocyanate, 1,4-phenylenediisocyanate, 1,3-phenylenediisocyanate, 1,4-cyclohexylenediisocyanate, 2,4-tolylenediisocyanate, 2,5-tolylenediisocyanate, 2,6-tolylenediisocyanate, 3,5-tolylenediisocyanate, 4-chloro-1,3-phenylenediisocyanate, 1-methoxy-2,4-phenylenediisocyanate, 1 - methyl-3,5-diethyl-2,6-phenylenediisocyanate, 1,3,5-triethyl-2,4-phenylenediisocyanate, 1-methyl-3,5-diethyl-2,4-phenylenediisocyanate, 1-methyl-3,5 - diethyl-6-chloro-2,4-phenylenediisocyanate, 6-methyl-2,4-diethyl-5-nitro-1,3-phenylenediisocyanate, p-xylylenediisocyanate, m - xylylenediisocyanate, 4,6-dimethyl-1,3-xylylenediisocyanate, 1,3-dimethyl-4,6-bis-(beta-isocyanatoethyl) benzene, 3-(alpha-isocyanatoethyl) phenylisocyanate, 1 - methyl - 2,4-cyclohexylenediisocyanate, 4,4'-biphenylenediisocyanate, 3,3' - dimethyl-4,4'-biphenylenediisocyanate, 3,3'-dimethoxy-4,4' biphenylenediisocyanate, 3,3'-diethoxy-4,4' diphenylenediisocyanate, 1,1' bis-(4-isocyanatophenyl) cyclohexane, 4,4' - diisocyanatodiphenylether, 4,4'-diisocyanato-dicyclohexylmethane, 4,4'-diisocyanato - diphenylmethane (MDI and Mondur MO), 4,4' - diisocyanato - 3,3' - dimethyldiphenylmethane, 4,4' - diisocyanato - 3,3' - dichlorodiphenylmethane, 4,4'-diisocyanato - diphenyldimethylmethane, 1,5 - naphthylenediisocyanate, 4,4',4" - triisocyanato - triphenylmethane, 2,4,4'-triisocyanato-diphenylether, 2,4,6-triisocyanato-1-methyl-3,5-diethylbenzene, and the like. Further, it has been found to be feasible to use mixtures of the isomers of 4,4'-diphenylmethane diisocyanate as well as industrial crude materials which have a content of about 90% of 4,4'-diphenylmethane diisocyanate, 1,5-naphthylene diisocyanate, 4,4',4"-triphenylmethane triisocyanate, para-isocyanatophenyl phosphoric acid triester, and 1-(isocyanatophenyl)-ethyl isocyanate.

The reaction products of an excess of any of the above isocyanates with polyhydric alcohols such as trimethylol propane hexanetriol or glycerine may also be used as the isocyanate reactant. In addition, polyisocyanates which have been reacted with phenol or bisulphites as well as modified polyisocyanates obtained by the polymerization of diisocyanates and isocyanate-containing adducts to form perhydrotriazine rings may also be used.

In the preparation of cellular polyurethanes in accordance with this invention the quantities of the polyisocyanate to be used should be at least equivalent to the sum of the reactive hydrogen atoms in all of the reactants present. Where water is used as a blowing agent, an excess of the organic polyisocyanate corresponding to the amount of water to be used will also be required. Further, an excess of isocyanato groups may also be incorporated into the structure of the polyurethane foam by polymerization or by secondary addition reactions.

Instead of or in addition to the use of water as a blowing agent, as mentioned hereinabove, any suitable low boiling halogenated or unhalogenated, saturated or unsaturated hydrocarbon may also be used. Some such suitable compounds which may be used as blowing agents with or instead of the water are pentane, hexane, heptane, pentene, heptene and the like; azo compounds such as azohexahydrobenzodinitrile and the like, halogenated hydrocarbons such as, dichlorodifluoroethane, dichlorodifluoromethane, trichlorofluoromethane, vinylidene chloride, methylene chloride, and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, castor oil and sulphonated castor oil as well as salts thereof and/or alkylene oxide adducts of hydroxyl or amino compounds of castor oil and/or sulphonated castor oil. With these emulsifiers it is often expedient to use a foam stabilizer such as a silicone oil, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ the silicone oil of the above patent within the scope of the formula

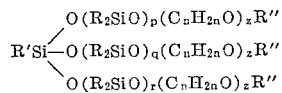

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

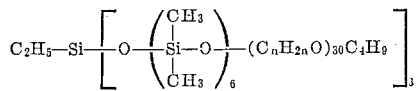

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537; 668,478 and 670,091. Other suitable compounds may therefore have the formula

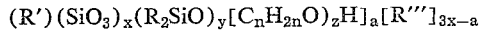

where $x$ is an integer and represents the number of trifunctional silicone atoms bonded to a single monovalent or polyvalent hydrocarbon radical, R'; R represents monovalent hydrocarbon radicals, such as, alkyl, aryl or aralkyl radicals, the polyoxyalkylene chain terminates with a hydrogen atom, R''' is an alkyl radical or a trihydrocarbonsilyl radical having the formula $R_3Si-$ where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It is to be further understood that such compositions of matter are mixtures of block copolymers wherein $y$ and $z$ are of different values and that methods for determining the length of the polysiloxane chains and the polyalkylene chains give values which represent average chain lengths.

One type of block copolymer is represented when $x$ in the above formula is one; in this instance, a branched chain formula may be postulated as follows:

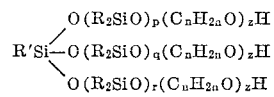

where $p+q+r$ has a minimum value of 3, the other subscripts being the same as in the immediately foregoing formula. Therefore, all three of the oxyalkylene chains are joined to the end of polysiloxane chains of the type $-(R_2SiO)-$. Specifically, one could use

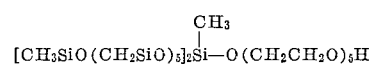

Any suitable catalyst may be used to initiate and accelerate the polyurethane reaction if so desired. Some suitable catalyst which may be used in the polyurethane reaction are, for example, dimethyl benzyl-amine, dimethyl stearyl amine, permethylated diethylene triamine, N-methyl-N'-dimethylaminoethyl piperazine, N,N'-endoethylene piperazine, N-alkyl morpholines; tertiary aminoethers such as, for example, 1-alkoxy-3-dialkylaminopropane, tertiary amines with ester groups, salts of tertiary amines, especially with organic acids such as, for example, oleic acid, benzoic acid, and the like, dibutyl tin dilaurate, dibutyl tin di-2-ethyl hexoate, dibutyl-tin-bis-(dimethylamino caproate), stannous octoate, stannous oleate, lead naphthenate, ferric acetylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," J. W. Britain and P. G. Gemeinhardt, Journal of Applied Polymer Science, volume IV, Issue No. 11, pages 207–211 (1960). Further, any suitable metal catalyst such as tin-(II)-octoate, dibutyl-tin dilaurate, dibutyl-bis-(dimethylamino caproate) lead naphthenate, iron acetonyl acetate may also be used.

The foam materials of this invention may be produced in any suitable process by manual or mechanical mixing of the components. Suitable processes for the preparation of cellular polyurethane plastics are disclosed in U.S. Reissue Patent 24,514, together with suitable machinery to be used in conjunction therewith. In this manner, excellent foam materials are produced with a weight per unit volume which can be varied as desired simply by altering the proportions of the components. The cellular polyurethanes prepared in accordance with this invention possess excellent mechanical properties, a low degree of brittleness, good adhesion, satisfactory pore structure and only a very low tendency to shrink.

Although the polyhydroxyurea polyamines of this invention are excellent for the production of cellular polyurethanes ranging from elastic to rigid foams with all of the intermediate types of cellular polyurethanes between these two extremes, they are particularly well suited for the production of rigid foam materials which possess high comprehensive strength values. These rigid cellular polyurethanes are particularly well suited for use in insulating the walls of dwellings and the like, for insulating refrigerated vans and the like, for imparting flotation properties to objects and boats and the like, for the fabrication of decorative art such as Christmas tree ornaments.

The invention is further illustrated but is not intended to be limited by the following examples in which all parts and percentages are by weight unless otherwise specified.

*Production of the polyhydroxyurea polyamines*

(A) After being mixed with about 400 g. of water, about 2784 g. (48 mols.) of propylene oxide are added at about 90°–100° C. in about 5 hours to about 1440 g. (24 mols.) of ethylene diamine. After cooling to about 70° C., about 720 g. (12 mols.) of urea are added and the mixture is heated for about 3 hours under reflux at about 100° C., and thereafter, the mixture is heated under reduced pressure for about 9 hours while gradually raising the temperature to 135° C. thus allowing ammonia to evolve and the water added at the start to be distilled off. A reduction in weight of about 727 g. is observed which corresponds to about 90% of the calculated quantities of ammonia and water to be removed. The clear light yellow liquid obtained, which is highly viscous at room temperature, crystallizes on standing for a period of time.

In order to reduce the viscosity, about 2355 g. (40.6 mols.) of propylene oxide are added to about 4585 g. of the condensation product in an autoclave over a period of twelve hours, the mixture being heated at about 120° C. without adding a catalyst. An almost colorless, clear liquid which does not crystallize, even when standing for a relatively long time, is formed, the said liquid having a viscosity of about 24976 cp./25° and a hydroxyl number of about 650.

(B) Di-(2-hydroxypropyl)-ethylene diamine (about 191 mols.) is produced by the addition of about 22.1 kg. (382 mols.) of propylene oxide to about 11.46 kg. (191 mols.) of ethylene diamine, to which about 286 g. of water (2.5%) have been added, the production being completed in about 10 hours at about 90°–100° C. About 5.73 kg. (95.5 mols.) of urea are then introduced at about 130° C. in about 8 hours, in batches comprising portions of about 573 g. each, while ammonia escapes. After the evolution of ammonia has ceased, the temperature is raised for about four hours to about 150° C. A clear light yellow condensation product is obtained with a viscosity of about 1960 cp./25°. (About 1 g. of this material is equivalent to about 5.72 ml. of N—HCl (bromophenol blue). Thereafter, about 11.07 kg. (191 mols.) of propylene oxide are added over a period of about 18 hours at about 140°–160° C. without addition of a catalyst. A clear reddish-yellow liquid is obtained with a viscosity of about 27400 cp./25° and a hydroxyl number of about 648. (Infrared spectrum: urea-carbonyl band at 1675 cm.$^{-1}$.)

(C) About 720 g. (12 mols.) of ethylene diamine are mixed with about 200 g. of water and thereafter about 2088 g. (36 mols.) of propylene oxide are added in about 6½ hours at about 95°–100° C. After adding about 360 g. (6 mols.) of urea, the mixture is heated for about eleven hours at about 100°–135° C., during which there is a reduction in weight by about 360 g. (equal to about 89.2% of the calculated quantity of ammonia and water to be removed.) A clear, viscous, resinous material having an hydroxyl number of about 783 is obtained. After the addition of about 793 g. (13.7 mols.) of propylene oxide in about fifteen hours at about 130° C. without adding a catalyst, the viscosity has greatly decreased, and amounts to about 35011 cp./25°. The clear, golden-yellow polyhydroxyurea diamine thus obtained has a hydroxyl number of about 649.

(D) About 720 g. (12 mols.) of ethylene diamine are added to about 1776 g. (24.7 mols.) of 1,2-butylene oxide in about 8 hours at about 100° C. in the presence of about 25 g. of water. Thereafter, the di-(hydroxybutyl)-ethylene diamine thus produced is heated with about 360 g. (6 mols.) of urea for about 11½ hours at about 135° C. with about 200 g. (11.7 mols.) of ammonia (98.2% of the theoretical amount) being split off. After the addition of about another 900 g. (12.5 mols.) of 1,2-butylene oxide in about ten hours at about 135° C., a clear, golden-yellow liquid is obtained which has a viscosity of about 25868 cp./25° and an hydroxyl number of about 555.

(E) About 8 g. of water are added to about 704 g. (8 mols.) of tetramethylene diamine and then about 928 g. (16 mols.) of propylene oxide are added in about three hours at about 80°–100° C. After the addition of about 240 g. (4 mols.) of urea, the mixture is heated for about four hours at about 135° C. and for about another four hours at about 150° C., while about 135 g. (7.82 mols. or 97.8% of the calculated quantity) of ammonia evolves. Thereafter, about 821 g. (14.17 mols.) of propylene oxide are added in about six hours while heating the mixture at about 140° C. A clear, light yellow liquid is obtained which has a viscosity of about 20012 cp./25° and an hydroxyl number of about 608.

(F) In a manner similar to (E), about 696 g. (6 mols.) of hexamethylene diamine, about 45 g. of water and about 696 g. (12 mols.) of propylene oxide are reacted in two hours at about 100° C. About 180 g. (3 mols.) of urea are then introduced and about 102 g. (6 mols.) of ammonia are split off by heating for about seven hours at about 140° C. About another 522 g. (9 mols.) of propylene oxide are added in about ten hours at about 140°–150° C. The clear golden-yellow liquid obtained has a viscosity of about 30300 cp./25° and an hydroxyl number of about 590.

(G) About 704 g. (4 mols.) of di-(hydroxypropyl)-ethylene diamine and about 148 g. (2 mols.) of methylurea are heated for about eighteen hours at about 150° C. About 89 g. of ammonia and methylamine (92.8% of the calculated quantity) escape. After the addition of about 195 g. (3.37 mols.) of propylene oxide in about nine hours at about 130° C., a clear light yellow liquid is formed having a viscosity of about 37200 cp./25° and an hydroxyl number of about 644.

(H) In a manner similar to (A), and by reaction of urea, ethylene diamine and propylene oxide in the molar ratio 1:2:6, the following polyhydroxyurea diamine is obtained:

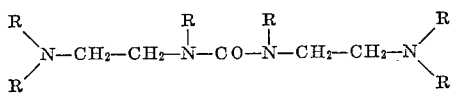

in which R represents —CH$_2$—CHOH—CH$_3$. (OH number: about 681, viscosity about 30230 cp./25°.)

To about 2729 g. of this hexa-(hydroxypropyl)-urea diamine is added a solution of sodium methylate in methanol, obtained by introducing about 16 g. of sodium metal into about 100 ml. of methanol and thereafter carefully removing the methanol under reduced pressure at about 80° C. The basic activation due to the sodium methylate amounts to about one sodium atom to about 48 OH groups or about 0.58% of sodium metal, calculated per mol. of starting molecule. In an autoclave, about 2700 g. (46.5 mols.) of propylene oxide are added to the mixture thus prepared over a period of about five hours while heating at about 130° C. The catalyst is then neutralized by adding about 176 mols. of HCl (1:1), and water is removed by heating under reduced pressure at about 100° C. After filtering off the product from the precipitated salt, a clear golden yellow thinly liquid branched polyether is obtained which has a viscosity of about 2341 cp/25° and an hydroxyl number of about 362.

(I) 1440 g. (24 mols.) of ethylene diamine have added thereto after addition of 400 g. of water within four hours 278 g. (48 mols.) of propylene oxide at 80° C. at maximum. Then 720 g. (12 mols.) of urea are added. The mixture is heated for 11 hours to 100 to 130° C. and further six hours to 140° C. in water-jet vacuo. 4682 g. of colorless product are obtined which chrystallises while standing. 1762 g. (30.4 mols.) of propylene oxide are added to 4565 g. of this product in an autoclave within three to four hours at 140° C. The practically colorless material thus obtained has a viscosity of 23860 cp./25° and an OH number of 671.

(J) By adding of 90 mols. of propylene oxide to 30 mols. of ethylene diamine in the presence of 45 g. of water (2.5 percent calculated on ethylene diamine) tri-(2-hydroxypropyl-)ethylene diamine is obtained. 1 g. is equivalent to 8.1 ml. of n-HCl (calculated 8.55 ml. n-HCl).

1404 g. (6 mols.) of this adduct and 180 g. (3 mols.) of urea are reacted together under splitting off 75 g. of ammonia (73.5 percent of theory) while heating for 11 hours to 150° C. The viscosity of the product is 11105 cp./50° C. 1 g. of the product corresponds to 5.74 ml. of n-HCl.

After addition of further 297 g. (5.12 mols.) of propylene oxide to 1509 g. of the product at 80° C. the viscosity increases to 43128 cp./25° OH number 733; titration value 5.71 ml. n-HCl/g.

(K) 1416 g. of mono-(2-hydroxypropyl-)ethylene diamine (obtained by reaction of ethylene diamine and propylene oxide in the molar ratio 1:1 and in the presence of 1 percent of water; titration value 16.35 ml. n-HCl/g.) are heated with 360 g. (6 mols.) of urea for four hours to 130° C. and for four hours to 150° C. 1568 g. of the condensate are obtained to which 1160 g. (20 mols.) of propylene oxide are added with eight hours at 130° C. The product is pale-yellow and clear; OH number 683; viscosity 10412 cp./25°; titration value 4.88 ml. n-HCl/g. The infra-red spectrum shows the urea carbonyl band at 1680μ.

(L) 4 mols. of propylene oxide are added to 2 mols. of hexahydro-p-phenylene diamine in the presence of 1 percent of water for six hours at 135° C. The product obtained is condensed with 1 mol of urea for 17 hours at 150° C. Then propylene oxide is added as long as reaction therewith proceeds. A product is obtained with an OH number of 542 and a viscosity of 8550 cp./25°.

(M) 348 g. (6 mols.) of propylene oxide are added to 267 g. ( 2 mols.) of dipropylene triamine in the presence of 2 g. of water within five hours at 90° C. After addition of 60 g. (1 mol.) of urea heating is continued for eight hours at 140° C. until 643 to 646 g. of product remain. Addition of 158 g. (2.73 mols.) of propylene oxide at 130° yields a clear red-brown resin (OH number 605).

744 g. of this resin have added thereto 8.5 g. of sodium metal dissolved in methanol. Methanol is removed at 75 to 100° C. in water-jet vacuo. 740 g. (12.8 mols.) of propylene oxide are added within five hours at 135° C. The catalyst is neutralised with 284 ml. of n-HCl. Precipitated salt is filtered with suction after removal of the water. The liquid product has an OH number of 347 and a viscosity of 9350 cp./25° C.

*Example 1*

About 30 parts by weight of (C) are thoroughly mixed with about 70 parts by weight of a polyester (OH number about 380) prepared from phthalic anhydride, adipic acid, oleic acid and trimethylol propane; about 0.3 part by weight of polysiloxane polyalkylene glycol ester and about 6 parts by weight of sodium-castor oil sulphate (50% of water). After adding about 158 parts by weight of 4,4'-diphenylmethane diisocyanate (90%), the mixture is introduced into molds, in which a foam material having the following physical properties is formed:

| | |
|---|---|
| Weight per unit volume, kg./m.$^3$ | 56 |
| Compressive strength, kg./cm.$^2$ | 5.4 |
| Impact toughness, kg./cm. | 0.4 |
| Hot-bending strength, ° C. | 190 |
| Water absorption, vol. percent | 3 |

The foam material has a very good temperature stability.

*Example 2*

About 30 parts by weight of (C) are stirred with about 20 parts by weight of a polyester (OH number 380) prepared from phthalic anhydride, adipic acid, oleic acid and trimethylol propane; about 50 parts by weight of a propoxylated trimethylol propane (OH number 380); about 0.5 part by weight of polysiloxane polyalkylene glycol ester and about 2 parts by weight of sodium-castor oil sulphate (50% water). About 127 parts by weight of 4,4'-diphenylmethane diisocyanate (90%) and about 40 parts by weight of monofluorotrichloromethane are added to this mixture. A foam material is formed which has the following physical properties:

| | |
|---|---|
| Weight per unit volume, kg./m.$^3$ | 25 |
| Compressive strength, kg./cm.$^2$ | 1.6 |
| Impact toughness, kg./cm. | 0.2 |
| Hot-bending strength, ° C. | 125 |
| Water absorption, vol. percent | 2 |

The foam material has a good compressive and heat strength.

*Example 3*

About 30 parts by weight of (D) are thoroughly mixed with about 70 parts by weight of a polyester (OH number 380) prepared from phthalic anhydride, adipic acid, oleic acid and trimethylol propane; about 0.3 part by weight of polysiloxane polyalkylene glycol ester and about 6 parts by weight of sodium-castor oil sulphate (50% of water). After stirring in about 151 parts by weight of 4,4'-diphenylmethane diisocyanate (90%), the mixture is introduced into molds, in which a foam material having very good heat resistance and the following properties is formed:

Weight per unit volume, kg./m.³ _____ 50
Compressive strength, kg./cm.² _____ 4.7
Impact toughness, kg./cm. _____ 0.3
Hot-bending strength, °C. _____ 195
Water absorption, vol. percent _____ 3

Example 4

About 30 parts by weight of (D) are thoroughly mixed with a polyester (OH number 380) prepared from phthalic anhydride, adipic acid, oleic acid and trimethylol propane; about 50 parts by weight of a propoxylated trimethylol propane (OH number 380); about 0.5 part by weight of polysiloxane polyalkylene glycol ester and about 2 parts by weight of sodium-castor oil sulphate (50% water). After adding about 120 parts by weight of 4,4'-diphenylmethane diisocyanate (90%) and about 40 parts by weight of monofluorotrichloromethane, a fine-pored foam material is formed which has the following properties:

Weight per unit volume, kg./m.³ _____ 23
Compressive strength, kg./cm.² _____ 1.4
Impact toughness, kg./cm. _____ 0.2
Hot-bending strength, °C. _____ 126
Water absorption, vol. percent _____ 2

Example 5

30 parts by weight of (B) are thoroughly stirred with 20 parts by weight of a polyester (OH number 380) prepared from phthalic acid anhydride, adipic acid, oleic acid and trimethylol propane, 50 parts by weight of a propoxylated trimethylol propane (OH number 380), 1.0 part by weight of a permethylated aminoethyl piperazine, 1.0 part by weight of permethylated diethylene triamine, 0.5 part by weight of polysiloxane polyalkylene glycol ester, 2.0 parts by weight of the sodium salt of a sulfonated castor oil (50 percent water) and 40 parts by weight of monofluorotrichloromethane and 132 parts by weight of 4,4'-diphenyl methane diisocyanate (90 percent) are added thereto. The resulting foam shows the following physical properties:

|  | Weight per unit volume, kg./m.³ | Compressive strength, kg./cm.² | Impact Toughness, kg./cm. | Hot Bending Strength, °C. | Water absorption, vol. Percent | Thermal Conductivity Kcal./m.-h.-°C. |
|---|---|---|---|---|---|---|
| Free | 22 | 1.0 | 0.4 | 143 | 4 | |
| Compressed | 37 | 2.7 | 0.7 | 133 | 3.4 | 0.020 |

The dimension stability of the foams is 100 percent at 80° C. and −10° C.

Example 6

30 parts by weight of (B) are thoroughly stirred with 20 parts by weight of a propoxylated trimethylol propane (OH number 380) and 50 parts by weight of propoxylated ortho phosphoric acid (OH number 380) under addition of 10 parts by weight of trichloro ethyl phosphate 1 part by weight of permethylated amino ethyl piperazine, 0.5 part by weight of polysiloxane polyalkylene glycol ester and 2.0 parts by weight of the sodium salt of a sulfonated castor oil (50 percent aqueous solution) and mixed with 30 parts by weight of monofluoro trichloro methane and 132 parts by weight of 4,4'-diphenylmethane diisocyanate (90 percent). The resulting foam shows the following mechanical properties:

|  | Weight per unit volume, kg./m.³ | Compressive strength, kg./cm.² | Impact Toughness, kg./cm. | Hot Bending Strength, °C. | Water absorption, vol. Percent | Thermal Conductivity Kcal./m.-h.-°C. |
|---|---|---|---|---|---|---|
| Free | 24 | 1.1 | 0.4 | 127 | 5 | |
| Compressed | 45 | 3.4 | 0.7 | 116 | 3 | 0.021 |

The dimension stability of the foams is 100 percent at 80° C. and −10° C. The protection against burning is defined by ASTM–D–1962. As an average the loss by burning is 24 mm. (B) has less activity in comparison with tetra-(2-hydroxy-propyl-) ethylene diamine.

Example 7

If 30 parts by weight of (A) instead of (B) as per Example 5 are used, a foam with the following physical properties is obtained:

| Weight per unit volume, kg./m.³ | Compressive strength, kg./cm.² | Impact Toughness, kg./cm. | Hot Bending Strength, °C. | Water Absorption, vol. Percent |
|---|---|---|---|---|
| 24 | 1.6 | 0.2 | 112 | 6.6 |

Example 8

If 30 parts by weight of (A) are used instead of (B) as per Example 6, a foam is obtained with the following physical properties:

| Weight per unit volume, kg./m.³ | Compressive strength, kg./cm.² | Impact Toughness, kg./cm. | Hot Bending Strength, °C. | Water Absorption, vol. Percent |
|---|---|---|---|---|
| 31 | 2.1 | 0.3 | 111 | 8.5 |

Examples 9 to 21

| No. | Polyhydroxyurea Polyamine | 1 | 2 | 3 | 4 | 5 | 6 | 7 | 8 | 9 | 10 |
|---|---|---|---|---|---|---|---|---|---|---|---|
| 9 | E | 50 | 50 | | | | 0.5 | | | 30 | 119 |
| 10 | F | 50 | | 50 | | 0.5 | 0.5 | 2.0 | | 40 | 132 |
| 11 | G | 30 | 20 | 50 | | 2.0 | 0.5 | 2.0 | | 40 | 126 |
| 12 | H | 100 | | | | 1.5 | 0.5 | 2.0 | | 40 | 102 |
| 13 | H | 70 | | 30 | | 1.5 | 0.5 | 2.0 | | 40 | 103 |
| 14 | I | 50 | | 50 | | | 0.5 | 2.0 | | 40 | 142 |
| 15 | I | 30 | | 20 | 50 | 0.5 | 0.5 | 2.0 | 10 | 30 | 128 |
| 16 | I | 30 | 20 | 50 | | 0.5 | 0.5 | 2.0 | | 40 | 128 |
| 17 | J | 50 | | 50 | | 0.5 | 0.5 | | | 30 | 134 |
| 18 | K | 30 | | 20 | 50 | 1.5 | 0.5 | | 10 | 30 | 114 |
| 19 | K | 30 | 20 | 50 | | 1.5 | 0.5 | 2.0 | | 40 | 129 |
| 20 | L | 50 | 50 | | | 2.0 | 0.5 | 2.0 | | 40 | 126 |
| 21 | M | 70 | 30 | | | 1.0 | 0.5 | | | 30 | 86 |

1 = starting material
2 = polyester prepared from adipic acid, phthalic acid anhydride, oleic acid and trimethylol propane (OH number 380)
3 = branched polyether prepared from trimethylol propane and propylene oxide (OH number 380)
4 = polyether prepared from ortho-phosphoric acid and propylene oxide (OH number 380)
5 = permethylated amino ethyl piperazine
6 = polysiloxane polyalkylene glycol ester
7 = sodium salt of a sulfonated castor oil (50 percent aqueous solution)
8 = trichloroethyl phosphate
9 = trichloro fluoro methane
10 = 4,4'-diphenyl methane diisocyanate (90 percent raw material)

The quantities of the components given in parts by weight in the table are quickly and thoroughly mixed. The resulting mixture is put into molds. Fine-porous, hard foams with the following properties are obtained:

| No. | Weight per unit volume, kg./m.³ | Compressive Strength, kg./cm.² | Impact Toughness, kg./cm. | Hot Bending Strength, °C. | Water Absorption, vol. percent | Thermal Conductivity, Kcal./m.-h.-°C. |
|---|---|---|---|---|---|---|
| 9 | 35 | 3.3 | 0.2 | 150 | 3.4 | |
| 10 | 24 | 1.5 | 0.1 | 140 | 5.0 | |
| 11 | 21 | 1.3 | 0.3 | 123 | 9.2 | |
| 12 | 26 | 1.7 | 0.3 | 106 | 7.0 | |
| 13 | 23 | 1.1 | 0.2 | 110 | 9.0 | |
| 14 | 23 | 1.6 | 0.2 | 140 | 2.2 | 0.020 |
| 15 | 28 | 1.9 | 0.3 | 120 | 4.0 | 0.022 |
| 16 | 23 | 1.2 | 0.2 | 117 | 2.7 | 0.020 |
| 17 | 38 | 3.4 | 0.4 | 150 | 3.8 | |
| 18 | 36 | 2.7 | 0.6 | 116 | 4.8 | |
| 19 | 21 | 1.3 | 0.2 | 136 | 7.5 | |
| 20 | 44 | 3.3 | 0.7 | 145 | 5.8 | |
| 21 | 35 | 2.4 | 0.5 | 120 | 3.3 | |

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane foam prepared by reacting an organic polyisocyanate, an organic compound containing at least two reactive hydrogen containing groups as determined by the Zerewitinoff method, and a blowing agent wherein at least a part of the active hydrogen containing compound is replaced by a compound having the generic formula

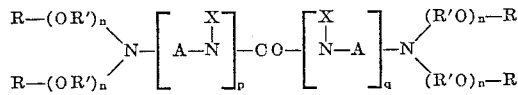

wherein R is an hydroxyalkyl group having at least two carbon atoms; R' is an alkylene group having at least two carbon atoms; A is a bivalent radical selected from the group consisting of aliphatic radicals, cycloaliphatic radicals, and aromatic hydrocarbon radicals; X is selected from the group consisting of hydrogen and the grouping —(R'O)$_n$—R wherein $n$ is an integer between 0 and 50; and $p$ and $q$ are integers between 1 and 5.

2. A polyurethane foam prepared by reacting an organic polyisocyanate, an organic compound containing at least two reactive hydrogen atoms as determined by the Zerewitinoff method, and a blowing agent wherein at least a part of the active hydrogen containing compound is the polyhydroxyurea polyamine having the formula

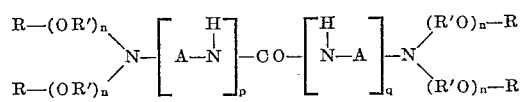

wherein R is an hydroxypropylene group, R' is propylene, $n$ is an integer between 1 and 50, A is an ethylene group and $p$ and $q$ are each integers between 1 and 5.

3. A polyurethane foam prepared by reacting an organic polyisocyanate, an organic compound containing at least two reactive hydrogen atoms as determined by the Zerewitinoff method, and a blowing agent wherein at least a part of the active hydrogen containing compound is the polyhydroxyurea polyamine having the formula

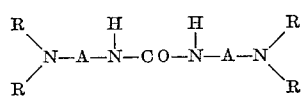

wherein R is a hydroxypropylene group and A is an ethylene group.

4. A polyurethane foam prepared by reacting an organic polyisocyanate, an organic compound containing at least two reactive hydrogen atoms as determined by the Zerewitinoff method, and a blowing agent wherein at least a part of the active hydrogen containing compound is the polyhydroxyurea polyamine having the formula

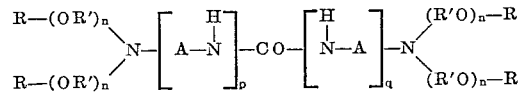

wherein R is an hydroxybutylene group, R' is butylene, $n$ is an integer between 1 and 50, A is an ethylene group and $p$ and $q$ are each integers between 1 and 5.

5. A polyurethane foam prepared by reacting an organic polyisocyanate, an organic compound containing at least two reactive hydrogen atoms as determined by the Zerewitinoff method, and a blowing agent wherein at least a part of the active hydrogen containing compound is the polyhydroxyurea polyamine having the formula

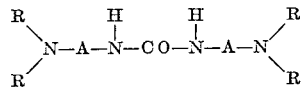

wherein R is an hydroxybutylene group and A is an ethylene group.

6. A polyurethane foam prepared by reacting an organic polyisocyanate, an organic compound containing at least two reactive hydrogen atoms as determined by the Zerewitinoff method, and a blowing agent wherein at least a part of the active hydrogen containing compound is the polyhydroxyurea polyamine having the formula

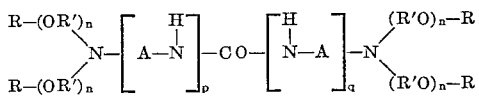

wherein R is an hydroxypropylene group, R' is a propylene group, $n$ is equal to an integer between 1 and 50, A is a tetramethylene group and $p$ and $q$ are each integers between 1 and 5.

7. A polyurethane foam prepared by reacting an organic polyisocyanate, an organic compound containing at least two reactive hydrogen atoms as determined by the Zerewitinoff method, and a blowing agent wherein at least a part of the active hydrogen containing compound is the polyhydroxyurea polyamine having the formula

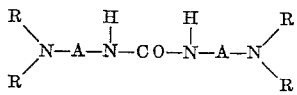

wherein R is an hydroxypropylene group and A is a tetramethylene group.

References Cited by the Examiner
UNITED STATES PATENTS

| | | | |
|---|---|---|---|
| 2,850,529 | 9/1958 | Pinson | 260—553 |
| 2,870,205 | 1/1959 | Beaver et al. | 260—553 |
| 2,956,031 | 10/1960 | Khawam | 260—2.5 |
| 3,001,955 | 9/1961 | Taub | 260—2.5 |

FOREIGN PATENTS

| | | |
|---|---|---|
| 1,027,870 | 4/1958 | Germany. |
| 1,067,212 | 10/1959 | Germany. |

DONALD E. CZAJA, *Primary Examiner.*

LEON J. BERCOVITZ, *Examiner.*

F. McKELVEY, *Assistant Examiner.*